May 31, 1966 C. L. BAKER 3,253,440
RIVET SETTING MACHINE
Filed Jan. 16, 1964 2 Sheets-Sheet 1

INVENTOR.
COLIN L. BAKER
BY
Ezekiel Wolf, Wolf & Greenfield
ATTORNEYS

３,253,440
Patented May 31, 1966

3,253,440
RIVET SETTING MACHINE
Colin L. Baker, Auburndale, Mass., assignor to Judson L. Thomson Manufacturing Co., Waltham, Mass., a corporation of Massachusetts
Filed Jan. 16, 1964, Ser. No. 338,202
6 Claims. (Cl. 72—19)

The present invention relates to rivet setting and more particularly to a rivet setting machine and method for applying a predetermined force to a rivet to be clinched to a work piece.

Mechanically and pneumatically operated rivet setting machines usually employ a fixed throw of a crankshaft or eccentric to rigidly determine the lower positions of a rivetting stem with respect to an anvil. The thickness of work pieces and the length of rivets clinched in such machines must be carefully controlled in order to avoid unsatisfactory large variations in clinching force. In some cases where large variations in force cannot be tolerated, a spring is normally included somewhere in the driving linkage of mechanical machines. Theoretically such springs should have easily adjusted preloads and low spring rates or stiffness. In addition to these requirements such springs should have long life, small size and low initial cost. These requirements are difficult to fill and consequently when work piece thicknesses are too great or rivet lengths too long, damage to the work piece or rivets frequently occurs. When work piece thicknesses are too small, inefficient clinching frequently results.

Pneumatically operated rivet setting machines may be either a beam or toggle action type. Beam or rocker arm machines normally comprise a substantially centrally hinged rocker arm extending in a horizontal direction at the top of the machine which acts as a lever having an air cylinder at one end and a rivet driver or stem at the other end. In beam machines, the extent of downward travel of the stem is normally determined by the lower position of the stem and such machines are normally extremely difficult to switch at the correct position of the stem. This problem is particularly acute when varying thickness workpieces such as ceramic workpieces are processed. When ceramic workpieces are overclinched breakage usually results.

In pneumatic toggle action machines the toggle action causes the force on a rivet being clinched to be dependent on both the force from the piston rod of the air cylinder and the nearness of the stem to the end of its stroke. In such a machine movement of the stem is usually controlled by limiting upper and lower stem travel. If this is not done in conventional machines, and resistance from the rivet increases during a clinching cycle, one of three alternatives occur. Either the piston reaches the end of the air cylinder; the resistance of the rivet reaches a magnitude at which full pressure builds up in the air cylinder without producing enough force to overcome it; or, an air valve operating the air cylinder is moved to a retract position when high and low pressure connections are reversed and as soon as a sufficient pressure is built up in the opposite direction, the piston reversed. If the first two alternatives occur, the machine cannot complete a clinching cycle without some external signal and the stem is locked in place firmly gripping the workpiece. Normally in order to bring about the desired third alternative, the piston is allowed to travel a predetermined distance after clinching a rivet to trip a switch of an air valve. This expedient makes this pneumatic operation similar to the crank operated machine which depends upon position of elements of the machine. Consequently the lower position of the stem must be predetermined and the problems noted above could occur in the operation of such machines.

Consequently, it is an important object of this invention to provide a means and method by which consistent desired rivet clinches are made even with irregular thickness workpieces by measuring the resistance force of a rivet being clinched to avoid overclinching or underclinching.

It is a further object of this invention to provide the means and method in accordance with the preceding object which is independent of anvil height, stem length, rivet length, workpiece thickness and positioning of these elements.

It is still another important object of this invention to provide a means and method in accordance with the preceding objects which is relatively inexpensive yet consistently produces clinches with accuracy enabling high production rates.

According to the invention, the rivet setting machine is controlled during its clinching cycle to respond to a force signal. The rivet setting machine comprises a conventional anvil with a conventional axially aligned stem and a linkage means connected to said stem at one end and to a power supply means at a second end. The power supply means comprises a force sensitive switch which is preset to reverse direction of the power supply means and consequently reverse direction of axial movement of the stem when a preset force is exerted on the stem in a direction opposite to its downward clinching movement. In the preferred embodiment of the invention, the power supply means comprises an air cylinder mounted on a resiliently yieldable spring which is in turn rigidly connected to a support. The spring carries a means for activating a switch to reverse direction of a drive piston contained in the air cylinder upon predetermined movement of the spring due to a reaction force exerted on the cylinder by the resistance of a rivet clinched in the machine.

Other features, objects and advantages of the invention will be better understood and appreciated from the following detailed description of one embodiment thereof selected for purposes of illustration and shown in the accompanying drawings, in which.

Figure 1:
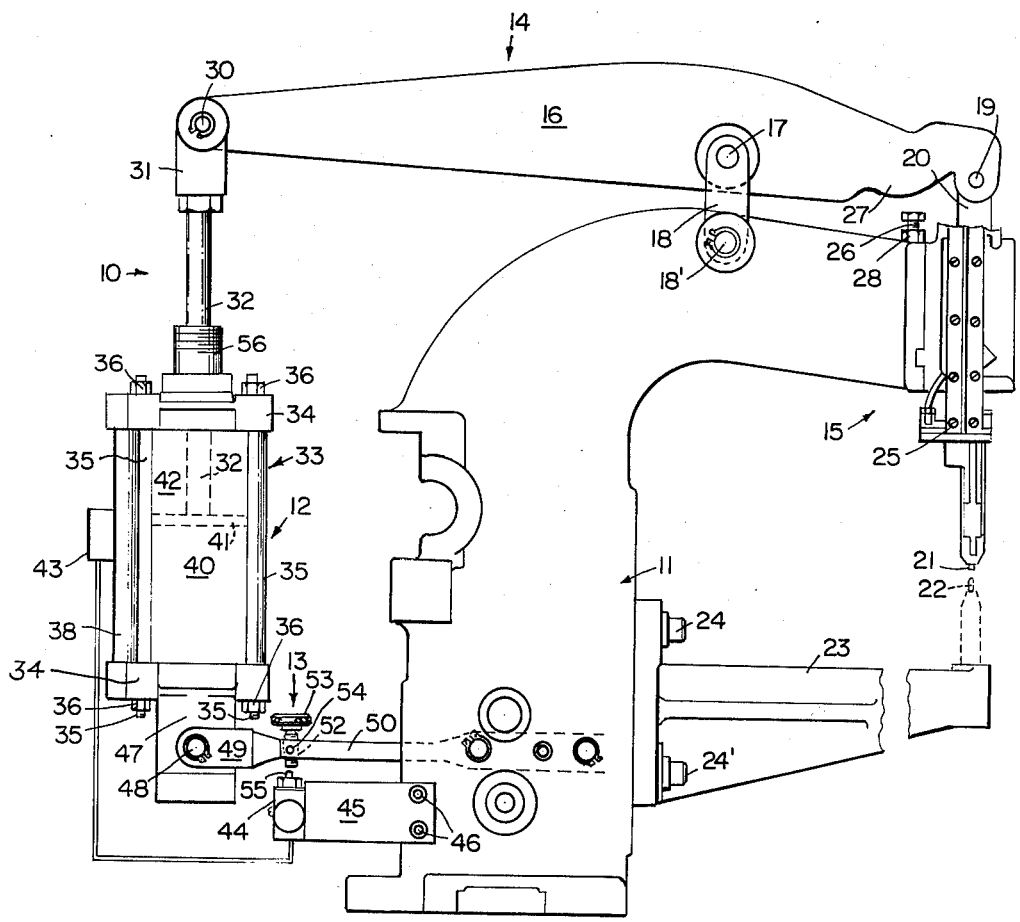
FIG. 1 is a side plan view of a preferred embodiment of a rivet setting machine of this invention.
Figure 2:
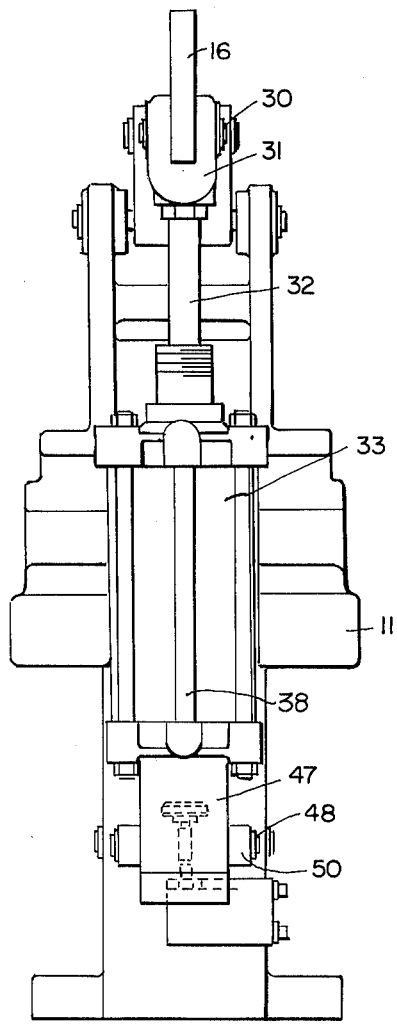
FIG. 2 is a rear view thereof.

With reference now to the drawings and in particular FIG. 1 thereof, a rivet setting or clinching machine 10 is shown having a frame 11 mounting a power supply 12, a force sensitive means 13, a linkage means 14 and a stem assembly 15.

The linkage means 14 preferably comprises elongated rocker arm 16 pivotably mounted on pin 17 which in turn is mounted on yoke 18. The yoke 18 is mounted on pin 18' and extends upwardly from the frame 11. The yoke 18 is stationary with respect to the frame. A first end of the rocker arm 16 carries pivot pin 19 on which is mounted a downwardly depending plunger or driver 20. The lower end of the driver 20 comprises a stem 21 axially aligned with an anvil 22. The anvil 22 rests upon a stationary extension bracket 23 preferably bolted to the main frame 11 by bolts 24 and 24'. The plunger 20 is mounted for reciprocal axial movement in a bore provided in a conventional stem assembly 15 mounted on the head of the machine frame 11. A known rivit feeding guide assembly 25 is preferably affixed to the head of the machine for feeding rivets during operation of the machine. The rivet feed mechanism is better described in United States patent application Serial No. 144,110, filed October 10, 1961, now abandoned, and will not be further described here since it does not form a part of this invention.

Prefereably an adjustable bolt 26 is threadably mounted on the head of the frame 11 directly underlying a projection 27 on the under-surface of rocker arm 16. Lock nut 28 is provided for positively locking nut or bolt 26 in place. This lock nut can be used to limit the downward travel of the stem portion 21; however, during normal operation of the machine the lock nut 26 lies well below the lowermost position of the rocker arm projection 27.

A second end of the rocker arm 16 is pivotally connected through pivot pin 30 to yoke 31 which is in turn locked to piston rod 32 which extends through bushing 56 of an upwardly extending air cylinder 33. The air cylinder 33 is of substantially conventional construction and comprises flat end plates 34 maintained about the cylinder by locking studs 35 and nuts 36 as shown in FIG. 1. A pressure transfer tube 38 is mounted between plates 34 for transferring air pressure from a portion 40 of the air cylinder below a piston head 41 to a portion 42 above the piston head 41 during cycling of the machine 10.

A four-way valve diagrammatically shown at 43 is also mounted between mounting plates 34 and controls the flow of air into and out of portions 40 and 42 of the air cylinder 33. The four-way valve is connected with force sensitive means 13 which preferably comprises an electrically operated solenoid 44 mounted on the rear of frame 11 by bracket 45 and mounting bolts 46.

The lower end of the air cylinder 33 is pivotally mounted through mounting bracket 47 by pivot pin 48 on a forked end 49 of a flat spring 50. Preferably spring 50 is a flat or leaf spring having an end fitting within and locked in position adjacent the frame 11 by a transverse notch provided in the frame 11. A threaded stud 52 lies within a threaded vertically extending bore in the flat spring 50. The lower end of the stud 52 is in axial alignment with a trip button 55 of the solenoid 44. The threaded stud 52 carries a knob 53 at its top for adjusting the stud with respect to the top of the trip button 55 of the solenoid. Lock screw 54 extends transversely through spring 50 and acts to bear against and lock the stud 52 in any desired vertical position.

Conventional air supply means, not shown, are connected with the air cylinder 33 providing the necessary pressure within the cylinder.

Turning now to the operation of the preferred embodiment of this invention, when a rivet to be clinched and workpiece are placed betwen the anvil 22 and stem 21, air is admitted to the lower portion 40 of the air cylinder 33 causing upward movement of the piston rod 32 and consequently downward movement of the driver 20. The driver 20 continues to push the stem 21 downwardly into contact with the rivet clinching the rivet until a point is reached where a predetermined amount of resistance force directed upwardly is met by the stem 21. This predetermined amount of rivet resistance force urges the air cylinder 33 downwardly against the resistance of the spring 50. At a predetermined magnitude of force, spring 50 yields with stud 52 moving downwardly to trip the solenoid 44. Solenoid 44 when activated in turn activates the four-way valve 43 to reverse the air in the air cylinder 33 causing a reduction of pressure in chamber portion 40 and increase in pressure in portion 52. Thus, the downward action of stem 21 is immediately stopped and as the air pressure builds up in chamber 42, the stem direction reverses. The cycle can then be repeated. It should be understood that different amounts of rivet resistance force can be measured by reactance through the air cylinder 33 and will cause varying degrees of movement of the spring 50. Therefore, by adjusting the distance between the stud 52 and the trip switch 55, as by rotating the stud, the maximum force applied between the stem and anvil can be easily predetermined.

While specific embodiments of this invention have been shown and described, many variations thereof are possible. For example, the particular type of plunger and stem employed may vary as may the type of power supply source used. Thus hydraulic cylinders of varying types can be used in place of the air cylinder. In some cases the frame may carry two heads with associated plural rocker arms, power supplies and force sensitive means.

Consequently the breadth of this invention is to be construed as limited only by the spirit and scope of the appended claims.

What is claimed is:

1. Apparatus for clinching rivets,
   said apparatus comprising a stem mounted for reciprocal axial travel,
   an anvil axially aligned with said stem,
   a pivotably mounted rocker arm having a first end linked to said stem and a second end linked to a pneumatic cylinder,
   said cylinder comprising a piston means for applying a force in a first direction through said rocker arm to said stem whereby said stem moves in a first direction of travel towards said anvil to clinch a rivet therebetween.
   a resiliently yieldable spring means mounting said cylinder and responsive to a predetermined reaction force on said cylinder in a second direction opposed to said first direction,
   a force sensitive means operatively engaged with said spring means for sensing said predetermined reaction force on said cylinder and reversing direction of travel of said stem when said force is reached.

2. Apparatus in accordance with claim 1 wherein said force sensitive means includes a trip switch and said spring means carries means for tripping said trip switch when said predetermined reaction force is reached.

3. Apparatus in accordance with claim 1 wherein said spring means comprises a leaf spring.

4. Apparatus in accordance with claim 3 wherein said tripping means comprises a threaded spindle spaced from and aligned with said trip switch and threadably engaged with said flat spring whereby said spindle may be rotated to permit tripping of said switch on reaction of said cylinder to various predetermined reactance forces.

5. Apparatus in accordance with claim 3 wherein said cylinder is pivotably mounted on said leaf spring.

6. Apparatus for clinching rivets to work pieces,
   said apparatus comprising,
   a stem mounted for reciprocal axial travel,
   an anvil axially aligned with said stem,
   a pivotably mounted rocker arm having a first end linked to said stem and a second end linked to a fluid activated pressure cylinder for applying a first force directed in a first direction to said stem through said rocker arm,
   said cylinder comprising a piston having a first end linked to said second end of said rocker arm and having a casing supported by a yieldable spring means,
   means comprising a force sensitive means for reversing the direction of travel of said stem when a predetermined reactance force is exerted on said cylinder casing,
   said spring means being operatively engaged with said force sensitive means whereby a predetermined amount of movement of said spring means actuates said force sensitive means to reverse said direction of travel.

References Cited by the Examiner

UNITED STATES PATENTS 2,578,546   12/1951   Havener _____ 218—2 X

CHARLES W. LANHAM, *Primary Examiner.*

GRANVILLE Y. CUSTER, JR., *Examiner.*

G. P. CROSBY, *Assistant Examiner.*